March 19, 1929.  G. B. SIPE  1,706,002

METHOD OF PRODUCING AND PLACING SHAFTS, PILES, AND THE LIKE

Filed April 15, 1925  6 Sheets-Sheet 2

Inventor
George B. Sipe
By Lancaster and Allwine
Attorneys

Inventor
George B. Sipe

March 19, 1929.  G. B. SIPE  1,706,002

METHOD OF PRODUCING AND PLACING SHAFTS, PILES, AND THE LIKE

Filed April 15, 1925  6 Sheets-Sheet 6

Patented Mar. 19, 1929.

1,706,002

UNITED STATES PATENT OFFICE.

GEORGE B. SIPE, OF SHREVEPORT, LOUISIANA.

METHOD OF PRODUCING AND PLACING SHAFTS, PILES, AND THE LIKE.

Application filed April 15, 1925. Serial No. 23,349.

The present invention embodies improvements in the method disclosed in my copending application for patent, filed October 26, 1923, Serial No. 671,015, entitled Method of producing and placing piles. In this connection, the invention is in part directed more particularly to an improved method where the casing or casings of the shaft, pile or the like remain in the cavity, in contradistinction to the method where the casing is removed after it has served its purpose in shaping cementitious material or in holding back earthy formations which have a tendency to cave in.

In the production and placing of substructures or foundations many different methods are resorted to and units used, much depending upon the prevailing conditions as to the selection of method and units for any specific undertaking. However, many projects have been abandoned after investigations, as by borings and sample taking, because of the limitations of methods, apparatus and units which have been extensively used in the past. Soils of different strata are encountered, and there may be a decided dip of the strata, beneath the site where it is proposed to erect a structure, making it difficult, hazardous or expensive to reach a firm foundation, or impractical to reach such by methods heretofore practiced. Among the limitations of methods, apparatus and units which have been extensively used may be mentioned the following, to distinguish the present invention from that which has been used or proposed:

Piles, regardless of their structure, dependent upon the method of driving them to place are necessarily limited in size, shape, penetration and accuracy and certainty of placement. Such method becomes inoperative when obstructions are encountered, or when great depths are required. These limitations often make the building of a required cofferdam impossible. The same limitations above referred to attend the use of either the jetting or hydraulic, or the dredging method. The blasting method employed to vary the size of pile at desired points is limited in certainty and accuracy of execution to meet many requirements. The sinking or placing into the earth, casings or forms of large dimensions, by means of pneumatic caisson method is attended with a fixed limitation of the amount of compressed air workmen are enabled to withstand, which is about fifty pounds pressure. As the pressure increases about one half pound to each foot of depth, the pneumatic caisson method becomes inoperative at a point but little below one hundred feet of depth.

The principal object of the present invention is to provide a method, freed of limitations among which are those above mentioned, whereby shafts, piles and the like of large diameter, and of any desired shape and length may be produced and placed in or through each and every formation, under any reasonable conditions, with accuracy, certainty, and dispatch, and some of which characteristics contribute to economy.

More specifically among the prime objects of the present invention are to provide, a method of drilling or forming a cavity in subaqueous formations to receive a casing which journeys downward to find a firm resting place, and whereby the cavity is protected from the inflow of water or the sea or other aqueous body into, beneath, or through which the pile is to be placed; a method whereby friction may be reduced, occasioned by progress of the casing downwardly as it follows the drill, or friction increased to more readily control downward movement of the casing, as when its weight becomes such as to make it undesirable to place dependence wholly upon apparatus above the cavity; a method whereby a pile may be provided having an enlarged base, or a shaft having an enlarged cavity at its lower end, as entrance into underground passageways, or any points intermediate its top and bottom as in coal seams; a method whereby the pile or shaft may have its upper terminal at any predetermined level, either in water or in other formations; and, a method of placing concrete in cavities of great depth without disintegration of concrete materials.

Other objects and advantages of the invention will appear in the following detailed description, taken in connection with the accompanying drawings, forming a part of this specification, and in which drawings only such equipment is shown, as an example, as will clearly demonstrate the efficacy of the method.

In the drawings where like characters designate similar or corresponding parts, characteristics, etc., throughout the several views, A designates generally a body of water, such as a portion of the sea and B earthy matter either below the body of water or of land; C suitable apparatus for forming a cavity D in the earthy matter B; E a casing for use in the cavity D; F reinforcement which may be disposed in the cavity D; G suitable apparatus for placing concrete in the cavity and for other purposes to be more fully hereinafter set forth; H a control device for the casing E used to an advantage when the casing is to have its upper terminal beneath the water or land surface; and J a device to keep water, as of the sea, from entering the cavity as shown by way of example in Figures 19, 20 and 21.

The present method is equally well adapted to use where a body of water overlies the earthy matter into which the shaft, pile or the like is to be produced and placed, as where water prevails only beneath the earth's surface, or where no water is encountered in any appreciable quantity. The earthy matter B may be of a muddy character as indicated at 22, quick sand 23 or other strata of flowing character, rock 24, and ordinary soil 25, such as sand and clay, or combinations thereof as loam, gumbo, etc. Before the kind of subfoundations of any magnitude is decided upon for any specific undertaking and the nature of the method to be pursued, it is desirable, if not essential, to make borings, take samples and determine the depth and character of the various strata, and their distances from the surface of the earthy matter, at points in and about the site where the foundations are located. In this way it is possible to determine the characteristics of the units which are to remain in the cavity which will best enable them to sustain the load coming upon or against same, and also the most desirable steps in the method to facilitate the placing of these units.

Figures 5, 6:
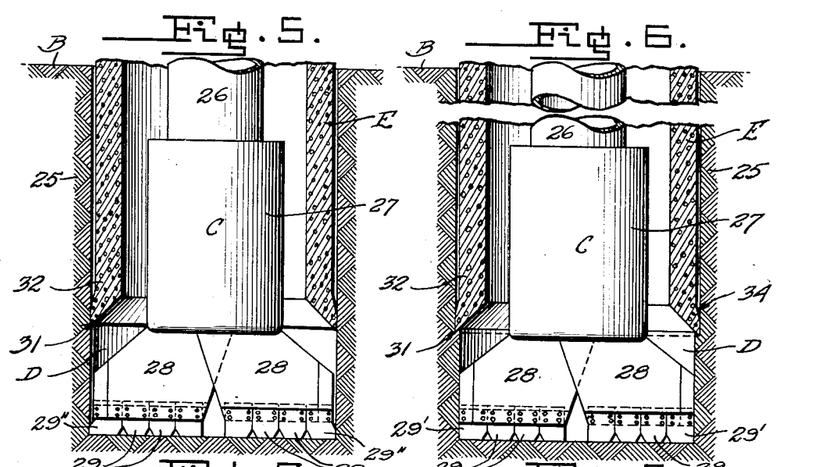
Figure 5 is a view similar to Figure 4, but showing the drill as having penetrated to a still further extent and with the casing following more closely the drill so as to prevent cave in of the side walls of the cavity and concentrate the flowing mud, which may be used when drilling, at the portion of the soil or strata thereof being drilled.
Figure 6 is a similar sectional view of a fragmentary character showing the drill having penetrated to a greater extent, the drill having been altered to cut a hole of less diameter than the maximum external diameter of the lower end of the casing so that descent of the casing is retarded by requiring it to break off or disrupt portions of the soil, thus relieving the apparatus used in controlling the casing, of some of its load.
Figures 18, 19, 20, 21:
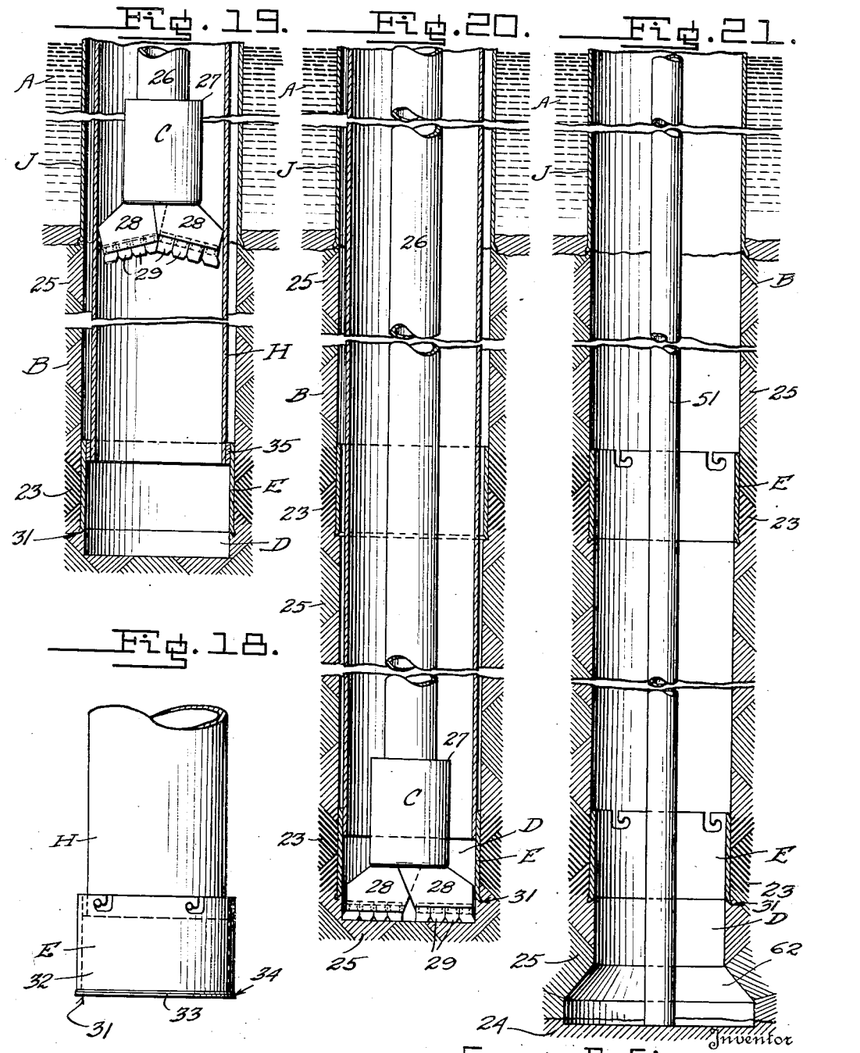
Figure 18 is a side elevation of a casing with a control member used in placing same, when it is desired to provide a casing only at strata which is of a flowing character, such as quick sand, or where water prevails, but where the majority of strata is self sustaining when and after being drilled.
Figure 19 is a view partly in elevation and partly in vertical section showing the members illustrated in Figure 18, in use, the drill collapsed and being removed, so that it may be altered to bore a smaller hole and so that the control member may be removed.
Figure 20 is a view similar to Figure 19 showing a second casing placed after the drill has penetrated to a greater extent.
Figure 21 is a view similar to Figure 19 but showing the drill as having penetrated further and enlarged the cavity, and drill and casing control member removed with a conductor tube for concrete in place and whereupon the steps of filling the cavity, as shown in Figures 11, 12 and 13 may be followed.

While the cavity D may be formed by use of any known or approved apparatus, that designated C in the example shown is a combined reducing expansion collapsible drill shown more in detail in my copending application for patent filed April 15, 1925, Serial No. 23,350. Among its main characteristics is a hollow drill stem 26, drill collar 27, and carriers 28 for removable blades 29. The carriers 28 may each have removable portions 30 cooperating with the blades 29 in such a manner that the cutting capacity of the drill may be increased or diminished at will, by the addition or removal of sections 30 and blades 29, or by a change in the blades only, as shown in Figures 5 and 6, where 29' in Figure 6 designates a terminal blade section having a cutting edge of less length than the terminal blade section 29'' shown in Figure 5. It is to be understood that a rotary motion is imparted to the drill stem 26 and parts carried thereby and that mud is preferably pumped and forced down inside the drill stem 26, to be directed through the collar 27 to impinge against the blades, thereby assisting in disrupting, dissolving and carrying upwardly of the particles broken off by the drill, the mud flowing upwardly at the outside of the drill stem and having egress from the cavity at the upper end thereof. One of the principal advantages of the drill shown is that it may be withdrawn and replaced through the casing E, when the carriers and blades are in collapsed position, as shown in Figure 19, to effect a change in the cutting capacity of the drill and that a cavity substantially twice the internal diameter of the casing E may be formed as when it is desired to provide enlarged entries at subterranean seams, cavities and the like, or to provide enlarged cavities for the base of piles, etc. Although it is preferred to excavate by drilling, any other method may be adopted for any stage of the work.

By use of the term "casing" as designating the unit or element E it is to be understood that this term is used broadly to designate what might be specifically termed a form, caisson, mold or lining; that it may be made of plain or reinforced concrete, wood, metal or any other suitable material or two or more in combination; and that it may be made with any approved shape in cross section, thickness of walls, and built up integral en masse or in sections suitably joined either longitudinally or transversally or both. In contradistinction to what is shown in my copending application for patent relating to a method, filed as aforesaid October 26, 1923, Serial No. 671,015, the casing E in the present method may be provided with a lower cutting edge 31 of a diameter greater than the external diameter of the main body portion 32 of the casing. The cutting edge 31 may be formed on the lower end of an outwardly flared portion 33, thus presenting an outwardly and downwardly inclined surface 34 from adjacent the juncture of the flared portion 33 with the main body portion 32, and the cutting edge 31. This has an advantage in that earthy matter of a flowing character may assist in causing the casing to descend by engagement with this inclined face, and will be pointed out more fully hereinafter. In some instances the upper portion of the casing E may be provided with an internally disposed ring 35, at its upper end portion, or any other suitable device to serve as a companion coupling member for the lower portion of control device 8, this ring being shown more particularly in Figures 14 and 16.

Figures 1, 2, 3, 4:
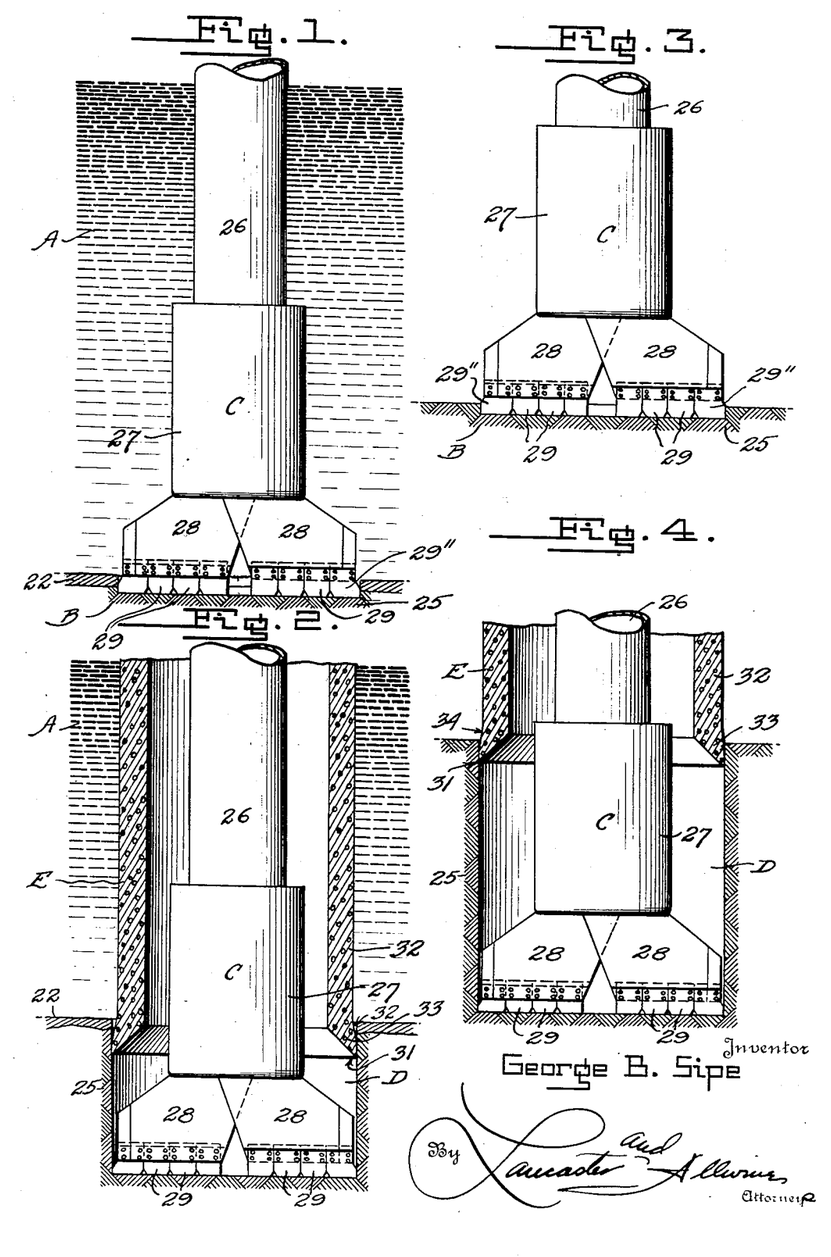
Figure 1 is an elevation of a drill in a body of water, the drill having penetrated the muddy bottom, and is an example of an initial step in the production of a pile in or beneath a body of water.
Figure 2 is a similar view showing the drill as having progressed further into the soil and the casing in place to descend as the drilling progresses and seal the cavity from the water of the sea or other aqueous body.
Figure 3 is an elevation of a drill penetrating the soil where a shaft or pile is to be provided in land, and is an example of an initial step in the method where superjacent water does not prevail.
Figure 4 is a similar view to Figure 3 showing the drill as having penetrated the soil to a further extent and a casing being lowered into the cavity formed by the drill but remote from the latter.

If the shaft, pile or the like is to be disposed, in, or extend into the earthy matter B below the body of water A, the cavity D may be started without first placing the casing E as shown in Figure 1, where the drill C is shown as having passed through the mud 22 and penetrated the earthy matter 25. The drill is shown equipped with blades for cutting a hole substantially the diameter of the cutting edge 31 of the casing so that the casing may descend readily into the cavity D after the drill has penetrated to the desired extent, as shown in Figure 2. Likewise, where the shaft, pile or the like is to be disposed in or extend into earthy matter which has not a superjacent body of water, the cavity D may be formed to the desired extent, before lowering the casing E, in which connection reference is had to Figures 3 and 4, the latter of which shows the drill as cutting a cavity of a diameter substantially equal to the diameter of the cutting edge, it being understood that the descent of the casing is controlled by mechanism, not shown in the drawings, above the cavity. As the casing descends, into the cavities primarily formed, it is held from close proximity to the drill, as shown in Figure 5. The distance between the lower portion of the casing and the upper portions of the blade carriers 28 may vary. It is to be observed that the flared lower portion of the casing holds back the earthy matter and when the casing is passing through a comparatively firm formation the outer face of the casing is spaced from the wall of the cavity, thus reducing friction to a minimum. As the drill continues to penetrate the earthy matter, and the casing follows the drill, it may be desirable to relieve the draw work or other apparatus used in controlling the casing of some of its load, and this may be accomplished by withdrawing the drill from the cavity, and altering the drill so as to have reduced drilling capacity, as shown in Figure 6, where the outermost blades 29″ have been substituted for those designated 29′. Thus the casing is caused to disrupt portions of the strata and the descent thereof is controlled to the extent that reliance need not be placed wholly upon apparatus exterior of the cavity to prevent rapid descent of the casing, which is gaining in weight as more material is added to it.

Figure 7:
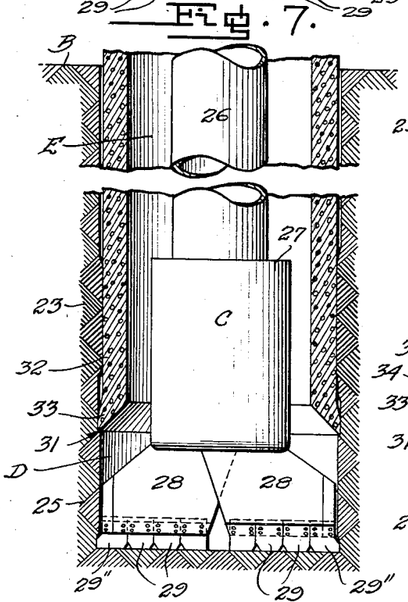
Figure 7 is a view similar to Figure 6 but showing further penetration and alteration of the drill to cut a larger cavity, to reduce skin friction as the casing descends since the soil thereabove has moved into intimate contact with the casing and thus relieves apparatus above the mouth of the cavity of some of its load.
Figure 8:
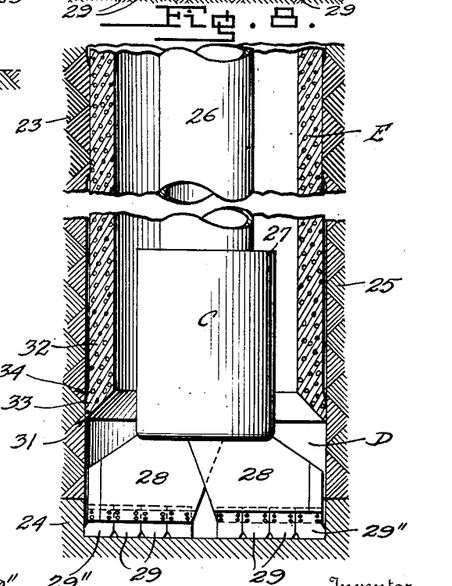
Figure 8 is a view showing further progress and penetration of rock or other hard material, the drill being adapted to cut a hole at least as large in diameter as the maximum external diameter of the lower end of the casing.

It may be found that, if the casing passes through a strata of quick sand 23, as shown in Figure 7, or other material of a flowing character, that too much resistance or skin friction will be produced to continue having the casing assist in enlarging the cavity, and thereby setting up resistance to its descent, and the drill may again be removed and the terminal blades 29″ replaced, as shown in Figure 7 so as to drill a hole substantially the diameter of cutting edge 31. If there is a thin stratum of rock 34, or other hard material, the drill must have a cutting capacity so as to produce a hole through this hard stratum substantially equal to, or slightly greater than the diameter of cutting edge 31, as is clearly shown in Figure 8.

Figure 9:
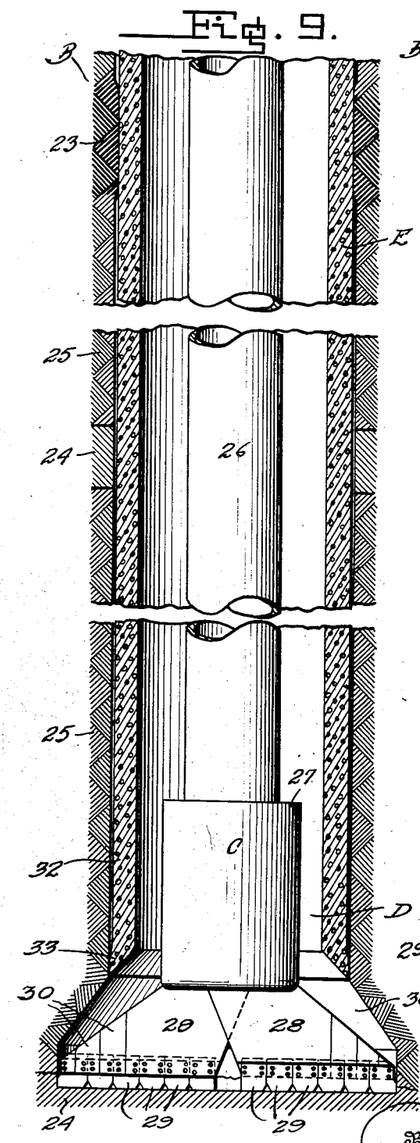
Figure 9 is an elevation of the drill enlarged to cut an enlargement in the cavity at its lower end, extending into hard formation of sufficient stability to sustain the superimposed weight which will come upon the pile, the various soil strata being shown in vertical section.
Figure 10:
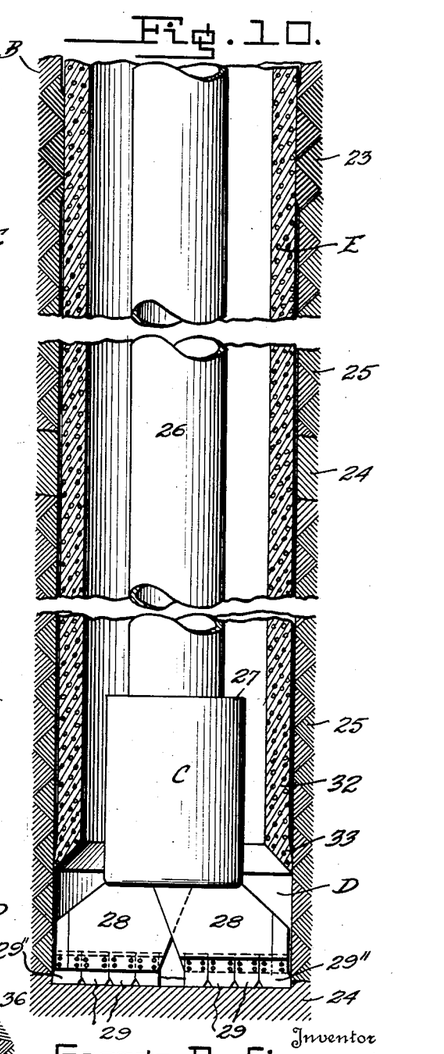
Figure 10 is a view similar to Figure 9 but showing no enlargement, the drill penetrating bed rock or other hard formation where no spread base is deemed necessary.

The formation of the cavity may continue until the desired depth has been attained, the drill being removed and altered to meet the various conditions encountered, and if it is desired to provide an enlargement anywhere between the top and bottom of the cavity, or at the bottom of the cavity, as shown in Figure 9, a plurality of sections 30 and blades 29 may be added to the carriers 28 so as to provide an enlargement 36 of the cavity, of considerable size. Such an enlargement is desirable at the base of a pile resting upon any firm or semi-firm base, so as to spread the load coming upon the pile, or add to its lateral facility. The cavity may continue, without enlargement, into bed rock 24, as shown in Figure 10 where bed rock is available or other hard formation making it unnecessary to provide a spread base.

It is to be observed that friction between the external surface of the casing and the earthy formations may be reduced to a minimum by use of the casing having the flared lower portion and that resistance to descent of the casing may be set up, by filling or otherwise forming portions of the cavity, in advance of the casing, of a diameter relatively less than the diameter of the cutting edge of the casing.

As previously stated, during the drilling operation, mud is forced downwardly through the drill stem 26 and finds exit from the drill collar 27, where it encounters the blades and assists in disrupting the material broken off by the blades. The particles are dissolved and carried upwardly through the cavity, exteriorly of the drill stem. When the cavity has been formed to a desired depth, plain water may be introduced into the cavity through the drill stem in substantially the same manner that the mud has been previously introduced, thus washing the cavity clear of mud, and particles of earthy matter not yet dissolved, that have been cut or broken away by the drill. After the water has been rendered clear to the desired extent, the drill may be removed and the cavity is in readiness to receive the filler if it is desired to provide a pile or the like. If the casing E is to act as a protection for the walls of the cavity, used as a shaft for ingress or egress to a mine or other subterranean cavity or conduit, or as an air shaft communicating with underground passageways, the cavity is then dewatered in any suitable manner.

The reinforcement F may be of any suitable material and design. It may be like that shown in my aforesaid copending application Serial No. 671,015, but is preferably made up for sections 40, suitably joined together as at 41, each section comprising a plurality of upright members 42, 43 and 44, the first and last mentioned being innermost and outermost, respectively; and a plurality of circumferentially or cross-wise extending members 45 joining the uprights 42, 43 and 44. The uprights 42 may be provided with inwardly directed offsets 46, and the uprights 44 with outwardly directed offsets 47. The joints 41 may be made by offsetting the terminal portions of the uprights as at 48 and binding together those of adjacent sections 40 as by suitable ties 49. Thus the reinforcement may be made in sections of suitable length to facilitate shipment, assembly, and the lowering of the reinforcement into the cavity, thereby providing a continuous reinforcement from bottom to top, or at any desired portion in the cavity.

The apparatus G for placing the concrete or other cementitious material or filler into the cavity D preferably comprises a conductor tube 50 extending into the cavity from above and including a major section 51 and a minor section 52, the latter telescoping in the former, and suspended as by chains 53, or other flexible connections, into operative relation to a hopper 54; and a bucket 55, controlled as by a cable 56. In the example shown the filler is concrete designated 57 and is introduced into the hopper 54, as from suitable mixing machines, not shown in the drawings, which may be mounted upon a platform 58 of a suitable tower 59 or other structure. The major section 51, which in itself may be made of sections joined in any suitable manner, is first let down into the cavity and into the water 60 if such prevails in the cavity. If reinforcement F is to be used, such may be let down into the cavity simultaneously with the conductor tube. The offsets 46 of the reinforcement may be provided to engage the outer surface of the conductor tube, while the offsets 47 may be provided to engage the internal periphery of the casing, thereby centering the reinforcement within the cavity, and centering the conductor tube as is obvious from an inspection of Figure 11.

Figure 11:
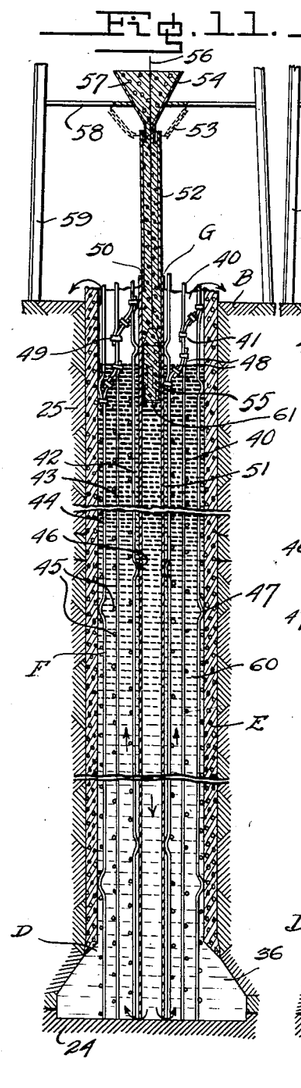
Figure 11 is a view in central vertical section through the cavity, casing and apparatus which may be used to introduce concrete into the bottom of the cavity.
Figure 12:
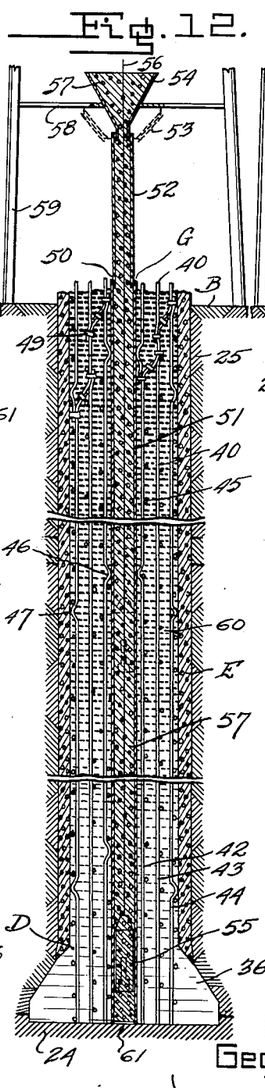
Figure 12 is a view similar to Figure 11 but showing the concrete at the bottom of a conductor tube and substantially in readiness to issue from the bottom thereof.
Figure 13:
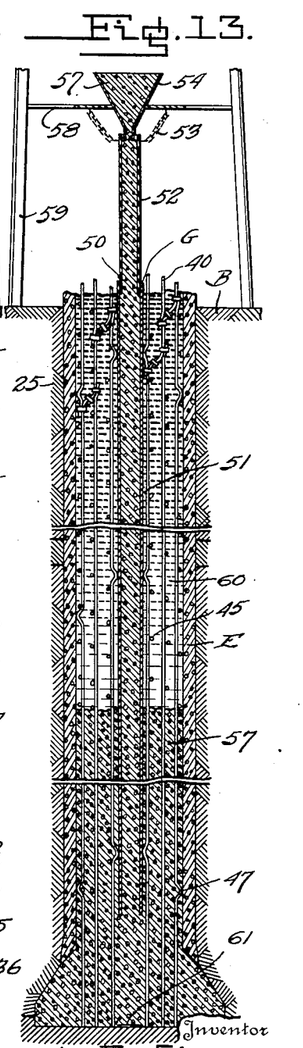
Figure 13 is a view similar to Figure 12 showing the conductor tube submerged in the unset concrete mass which is accumulating in the cavity and forcing the water upwardly and out of the cavity.

If water prevails in the cavity, the conductor tube will contain water when it is first placed, and the buckets 55 are provided in order that the conductor tube may be charged with a column of cementitious material, weakened in no way by the water which primarily exists in the conductor tube. The bucket, forming no part of the present invention, is so constructed as to have liquid tight engagement with the internal periphery of the conductor tube, and is lowered by means of the cable 56. In Figure 11, the conductor tube is partially charged with a column of cementitious material. As the column lowers in the conductor tube, the water is forced out of the tube as indicated by the arrows, and when the bucket finally reaches the lower portion of the conductor tube, its bottom is released, or it is otherwise operated to permit the withdrawal of the main body portion of the bucket through the column of cementitious material. In Figure 12 the bucket is shown as being withdrawn, having left its bottom 61 in the lower portion of the conductor tube. The weight of the column of cementitious material assists in forcing the water out of the conductor tube. After the conductor tube is fully charged with a column of cementitious material, it is raised off the bottom of the cavity thus permitting the cementitious material to flow into the bottom of the cavity and displace the water 60 upwardly. If desired, the conductor tube may be agitated, that is, reciprocated longitudinally, and moved circumferentially in order to compact the cementitious mass and cause it to move into the interstices of the reinforcement, if such has been provided. Before the conductor tube is raised to any extent a sufficient amount of cementitious material is permitted to issue from the conductor tube so that the lower end of the conductor tube will be well embedded in the cementitious mass, as shown in Figure 13. As the cementitious material displaces the water, the latter flows outwardly at the upper end of the cavity and it is to be noted that this body of water above the cementitious mass has a tendency to compact same, due to its weight. While I have herein referred to concrete and cementitious material, specifically as a filler, it is to be understood that other material may be used as a filler, such as sand, clay, broken stone, etc., or a combination of such, much depending upon the use to which the completed assembly will be put in practice. The column of cementitious material is maintained in the conductor tube until the cavity has been filled with cementitious material to substantially the extent desired, or until the cementitious material approaches the level at which it is desired to terminate the pile.

Figure 14:
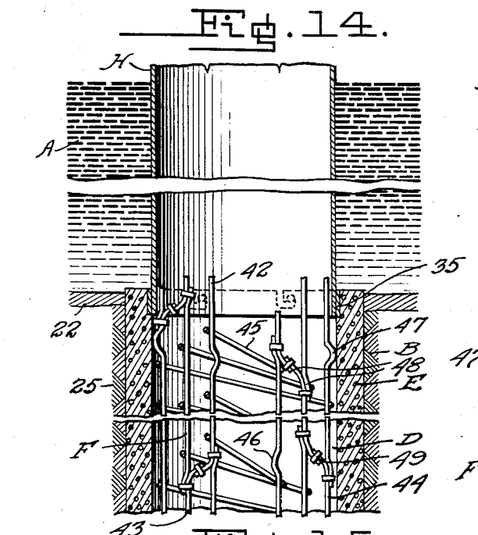
Figure 14 is a view in central vertical section showing means to assist in controlling the downward progress of the casing to a predetermined place below the surface of the water and preventing the inflow of the sea or other body of water into the cavity.
Figure 15:
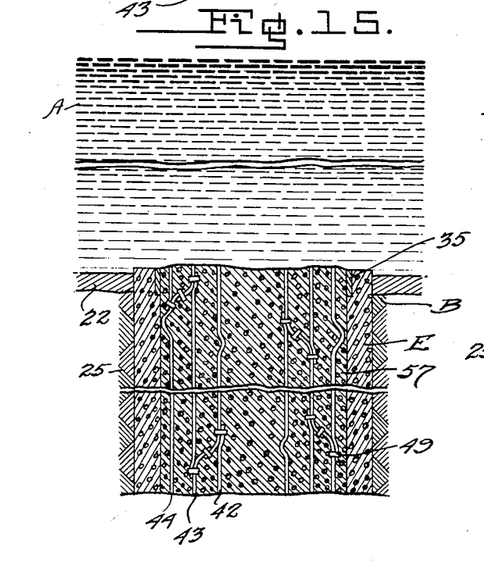
Figure 15 is a view similar to Figure 14, showing the pile terminating at the bottom of the body of water.
Figure 16:
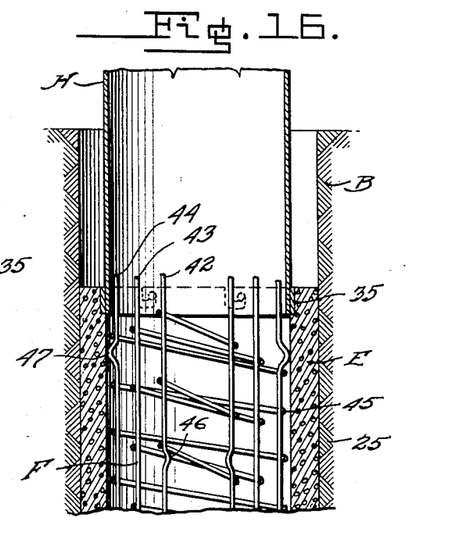
Figure 16 is a view similar to Figure 14, but showing the method of placing the casing in a predetermined place below ground level.
Figure 17:
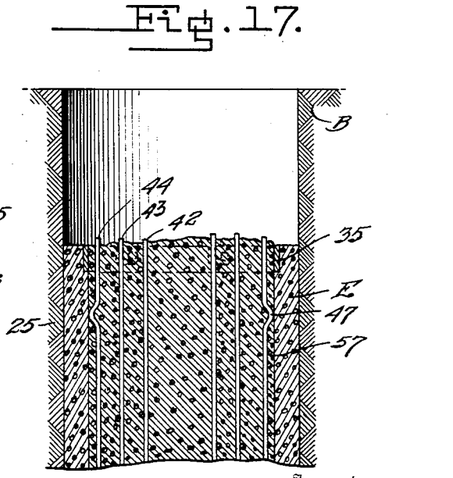
Figure 17 is a view similar to Figure 16 showing the pile terminated below the ground level.

When it is desired to terminate the pile in or below the body of water A, or below the surface of the earthy matter, the control device H is used in connection with the casing E, as shown in Figures 14 and 16. This control device is in the form of a tubular member which may have detachable connection with the casing E at the ring 35, as by the well known pin and bayonet slot connections. This tubular member also serves, as shown in Figure 14 to prevent the entrance of water of the sea, or other body of water into the cavity. Its prime function, however, is to limit the downward movement of the casing, so that it may terminate in substantially the same plane where the cementitious material is to be terminated. In Figure 15 the pile is shown as having its terminal at substantially the bottom of the body of water, the control device H having been removed after the cementitious material has set sufficiently to hold the casing in the desired position and to exclude sea water. In Figure 17 the pile is shown as terminating below the surface of the earthy matter, the control device H having been detached.

If the major portion of the formation to be passed through is sufficiently firm to sustain the walls of the cavity drilled, the casing E may be employed only to hold back or engage the unstable portions of the formation passed through, thereby materially reducing the cost of the completed pile. If this is to be accomlpished in earthy formation beneath a body of water A, the device J shown in Figures 19, 20 and 21, may be brought into use. It may be made of any suitable material, such as corrugated iron, and is lowered through the water and soft water bed allowing the lower end to rest in the formation subjacent to the muddy bottom. A cavity is then drilled in the earthy matter, open to the tubular casing J and through a portion of the first unstable formation, allowing a casing E, of suitable length or height to follow and finally case off completely the unstable formation. The casing E may be controlled by a device H, of the character hereinbefore described, having a detachable connection with the casing, as by pin and bayonet slot device. If there is one or more strata of unstable characteristics, the control device H may be detached from the casing E, the drill removed, altered to cut a cavity of smaller diameter below the casing thus set, and the same procedure is followed, as shown in Figure 20. Each time a casing E is set, if the cavity is to be continued below the lowermost casing, the drill is removed, and altered to continue the cavity through stable formation, for at least a distance sufficient to prevent the casing from dropping, and thereafter the cavity may be enlarged as shown at 62, in a manner hereinbefore described. In Figure 21, the conductor tube 50 is shown in place, in readiness to deliver cementitious material or filler into the cavity, the control devices H having been removed.

It is to be observed that the casing, being operated independently of the drilling, may extend from the surface to any predetermined level; from any predetermined level to any other predetermined level; or it may extend from the lower extremity of the cavity up to any predetermined level. The casing may extend the entire length of the cavity, permitting its cutting edge or lower extremity to become firmly seated in the formation in which the cavity has been terminated. Thus a cavity may be formed with its walls completely protected by the casing, and upon being dewatered may become a shaft for ingress or egress to a mine or other subterranean cavity, as hereinbefore set forth. The casing may have its walls of reinforced or plain concrete, comparatively thick thus giving a large range in construction to meet the various requirements attending its use as an integral part of underground structures or foundations of whatsoever character, that is, interlocked to form a cofferdam.

In reduction to practice I realize that the conditions concurrent with the adoption of the method will necessarily vary, and I desire to emphasize the fact that various changes in the sequence of steps taken in the method may be resorted to, or steps omitted, when required or desirable without sacrificing the advantages of the method.

While I have herein referred to my copending application for patent on combined reducing, expansive, collapsible drill, and other apparatus, it is to be distinctly understood that such is merely by way of example, and that the method may be carried out by the use of other apparatus than that herein disclosed and referred to, without departing from the spirit or scope of the appended claims.

I claim:

1. Those steps in the method of producing and placing shafts, piles and the like, which comprises, producing a cavity of varied dimensions, through various strata of earthy matter, the cavity being intentionally formed wide at some portions and relatively narrower at other portions according to the degree of hardness of the strata, and placing a casing to descend in the cavity, the casing having a width greater than the narrow portions of the cavity and less than the wide portions thereof whereby descent of the casing is frictionally retarded when encountering earthy formations at the narrow portions of the cavity.

2. Those steps in the method of producing and placing shafts, piles and the like, which comprises, drilling a cavity and placing a hollow casing to descend into the cavity as the drilling progresses, in such a manner that drilling in the cavity may proceed independent of the descent of the casing, drilling the size of the cavity to reduce friction of the casing with the walls of the cavity during descent at the initial drilling of the cavity when the casing which follows is comparatively light in weight and decreasing the size of the cavity to set up greater frictional resistance to descent when the cavity has been drilled deeper and the casing becomes comparatively heavy in weight.

3. Those steps in the method of producing and placing shafts, piles and the like, which comprises, drilling a cavity in the soil and removing the dislodged material through the cavity; placing a hollow casing, having a lower cutting edge to follow in the cavity as drilling and removal of the dislodged material progresses; and varying the cutting capacity of the drill to diminish the diameter of the cavity in the soil cut thereby to less than the diameter of the cutting edge of the casing when passing through strata of readily penetrable nature and to increase the diameter of the cavity cut by the drill to a dimension greater than the diameter of said cutting edge when passing through strata of a hard character.

4. Those steps in the method of producing and placing shafts, piles and the like, which comprises, drilling a cavity in the soil and removing the dislodged material through the cavity; placing a hollow casing, having a lower cutting edge of a greater diameter than the external diameter of the main body portion of the casing, to follow in the cavity as drilling and removal of the dislodged material progresses; and varying the cutting capacity of the drill to diminish the diameter of the cavity in the soil cut thereby to less than the diameter of the cutting edge of the casing when passing through strata of readily penetrable nature, and to increase the diameter of the cavity cut by the drill to a dimension greater than the diameter of said cutting edge when passing through strata of a hard character.

5. Those steps in the method of producing piles and the like which comprises, producing a cavity in the soil, placing an unenclosed conductor tube into the cavity with its egress end at the bottom of the cavity and its upper end adjacent the mouth of the cavity, substantially filling the tube from the bottom up with a column of cementitious material prior to any entrance of the cementitious material into the cavity exterior of the tube, moving the tube to permit exit of the cementitious material into the cavity at its bottom, and adding to and maintaining the column of cementitious material in the tube with the lower end of the tube embedded in the mass of cementitious material as it outlets into the cavity until the cavity is filled with cementitious material substantially to the desired extent.

6. Those steps in the method of producing piles and the like which comprises, producing a cavity in the soil, placing reinforcement and an unenclosed conductor tube in the cavity with the latter centered by the former, and with the egress end of the tube sealed against the bottom of the cavity, filling the tube with a column of cementitious material prior to any entrance to the cavity, moving the tube to permit exit of the cementitious material from the bottom end of the tube into the cavity at its bottom, and maintaining the column of cementitious material in the tube and the lower end of the tube embedded in the mass of cementitious material until the cavity is filled with cementitious material to substantially the desired extent.

7. Those steps in the method of producing piles and the like which comprises, producing a cavity in the soil, placing a hollow casing in the cavity, placing reinforcement and a conductor tube in the cavity and within the casing, with the reinforcement centered by the casing and the tube centered by the reinforcement, and with the egress end of the tube closed on the bottom of the cavity, filling the tube with a column of cementitious material and after being filled then moving the tube to permit exit of the cementitious material into the cavity at its bottom for the first time, and maintaining the column of cementitious material in the tube and the lower end of the tube embedded in the mass of cementitious material until the cavity is filled with cementitious material substantially to the desired extent.

8. Those steps in the method of placing a casing or the like within a cavity which comprises drilling a cavity into the soil, placing a casing to descend into the cavity by frictional engagement with the walls of the cavity, causing the casing to lower in frictional engagement with the walls of the cavity as the drilling progresses, and drilling the size of the cavity in advance of the casing in relation to the frictional resistance which the particular strata being drilled will offer to the descent of the casing, so that during drilling in firmer strata the size of the cavity drilled will be enlarged to lessen frictional resistance to the descent of the casing and during drilling through less firm strata the size of the cavity drilled will be decreased for offering greater frictional resistance to the descent of the casing.

GEO. B. SIPE.